United States Patent
Kielak

(10) Patent No.: US 10,678,495 B2
(45) Date of Patent: Jun. 9, 2020

(54) ELECTRONIC APPARATUS AND METHOD FOR ADJUSTING INTENSITY OF SOUND OF AN EXTERNAL DEVICE

(71) Applicant: SAMSUNG ELECTRONICS CO., LTD., Suwon-si (KR)

(72) Inventor: Michal Kielak, Krańcowa (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 93 days.

(21) Appl. No.: 14/954,063

(22) Filed: Nov. 30, 2015

(65) Prior Publication Data

US 2017/0039025 A1    Feb. 9, 2017

(30) Foreign Application Priority Data

Aug. 4, 2015   (KR) .................. 10-2015-0110255

(51) Int. Cl.
    *H04R 29/00*   (2006.01)
    *G06F 3/16*    (2006.01)
    *H04M 1/725*   (2006.01)

(52) U.S. Cl.
    CPC .......... *G06F 3/165* (2013.01); *H04M 1/7253* (2013.01); *H04R 29/001* (2013.01); *H04M 1/72533* (2013.01); *H04M 1/72597* (2013.01)

(58) Field of Classification Search
    CPC . G06F 3/165; H04M 1/7253; H04M 1/72533; H04M 1/72597; H04R 29/001
    USPC ............................ 381/56–59, 104–109, 96
    See application file for complete search history.

(56) References Cited

U.S. PATENT DOCUMENTS

| | | | |
|---|---|---|---|
| 8,081,765 B2 | 12/2011 | Yu | |
| 8,265,293 B2* | 9/2012 | Park | H04B 1/034 381/57 |
| 8,731,475 B1 | 5/2014 | Youngs et al. | |
| 8,797,465 B2 | 8/2014 | Hardacker et al. | |
| 2008/0212820 A1 | 9/2008 | Park | |
| 2010/0034395 A1* | 2/2010 | Lundin | H04M 19/044 381/57 |

(Continued)

FOREIGN PATENT DOCUMENTS

| | | |
|---|---|---|
| CN | 101742138 A | 6/2010 |
| KR | 1020000045069 A | 7/2000 |

(Continued)

OTHER PUBLICATIONS

Communication dated Dec. 9, 2016, issued by the European Patent Office in counterpart European Application No. 16157621.0.

(Continued)

*Primary Examiner* — Ammar T Hamid
(74) *Attorney, Agent, or Firm* — Sughrue Mion, PLLC

(57) ABSTRACT

An electronic apparatus includes a microphone; a communicator configured to communicate with an external device; and a controller configured to generate sound data based on a sound input to the microphone, receive audio data from the external device through the communicator, the audio data corresponding to a sound output from the external device, and control to transmit, through the communicator, a command to the external device to adjust an intensity of the sound output from the external device based on a result of comparison between the sound data and the audio data.

23 Claims, 15 Drawing Sheets

(56) References Cited

U.S. PATENT DOCUMENTS

| | | | |
|---|---|---|---|
| 2012/0020486 A1* | 1/2012 | Fried | H03G 3/32 |
| | | | 381/58 |
| 2012/0045990 A1* | 2/2012 | Sandell | H04M 1/6066 |
| | | | 455/41.2 |
| 2013/0072251 A1* | 3/2013 | Kim | H04M 1/7253 |
| | | | 455/550.1 |
| 2014/0078404 A1* | 3/2014 | Cheung | H04N 5/4403 |
| | | | 348/734 |
| 2016/0100265 A1* | 4/2016 | Maggiore | G06F 16/164 |
| | | | 381/56 |
| 2016/0110155 A1* | 4/2016 | Ievgen | H04L 12/12 |
| | | | 700/94 |
| 2016/0132046 A1* | 5/2016 | Beoughter | G05B 19/4184 |
| | | | 700/17 |
| 2016/0293180 A1* | 10/2016 | Ur | G10L 15/26 |
| 2016/0358460 A1* | 12/2016 | Lee | H04M 1/7253 |

FOREIGN PATENT DOCUMENTS

| | | |
|---|---|---|
| KR | 1020090123626 A | 12/2009 |
| KR | 101289732 B1 | 7/2013 |
| WO | 2013/042804 A1 | 3/2013 |
| WO | 2014/189297 A1 | 11/2014 |

OTHER PUBLICATIONS

Felix Scholkmann, et al., "An Efficient Algorithm for Automatic Peak Detection in Noisy Periodic and Quasi-Periodic Signals", Algorithms 2012, 5, Published Nov. 21, 2012, pp. 588-603.

Will Drevo, "Audio Fingerprinting with Python and Numpy", published Nov. 15, 2013, total 15 pages, http://willdrevo.com/fingerprinting-and-audio-recognition-with-python/.

Noise addicts, "Hearing Test—Can You Hear This?", 2009, total 66 pages, http://www.noiseaddicts.com/2009/03/can-you-hear-this-hearing-test/.

Communication dated Apr. 29, 2016, issued by the International Search Authority in counterpart International Application No. PCT/KR2015/013362 (PCT/ISA/210 & PCT/ISA/237).

Communication dated May 28, 2018, issued by the European Patent Office in counterpart European Application No. 18159083.7.

Communication dated Oct. 9, 2019, issued by the State Intellectual Property Office of P.R. China in counterpart Chinese Application No. 201580082168.4.

* cited by examiner

| No | Device |
|---|---|
| 1 | Smart Phone — 601 |
| 2 | Laptop — 603 |
| 3 | TV — 605 |
| 4 | Audio device — 607 |

| No | Device | Signal Ratio | |
|---|---|---|---|
| 1 | Smart Phone | 1.0 | — 901 |
| 2 | Laptop | 0.5 | — 903 |
| 3 | TV | 0.25 | — 905 |
| 4 | Audio device | 0.125 | — 907 |

ELECTRONIC APPARATUS AND METHOD FOR ADJUSTING INTENSITY OF SOUND OF AN EXTERNAL DEVICE

CROSS-REFERENCE TO RELATED APPLICATION

This application claims priority from Korean Patent Application No. 10-2015-0110255, filed on Aug. 4, 2015, in the Korean Intellectual Property Office, the disclosure of which is incorporated herein in its entirety by reference.

BACKGROUND

1. Field

Apparatuses and methods consistent with exemplary embodiments relate to adjusting an intensity of a sound of an external device, and more particularly, to automatically adjusting an intensity of a sound of an external device based on an environmental condition.

2. Description of the Related Art

Recently, a technology is being developed to provide an environment in which a plurality of electronic devices are connected wirelessly or by wire to form a network, data is exchanged between electronic devices located on the same network, and an electronic device controls another electronic device.

In particular, when a plurality of peripheral devices operate in a state in which a smartphone is connected to the plurality of peripheral devices through a network, the smartphone may automatically adjust sound intensities of the peripheral devices when the smartphone receives a phone call.

However, when a smartphone receives a phone call and adjusts sound intensities of peripheral devices, there is inconvenience because the sound intensities of the peripheral devices connected to the smartphone are collectively adjusted. In particular, there may be a problem in that the smartphone adjusts an intensity of a sound of an audio device in a main bedroom as well as an intensity of a sound of a television (TV) in a living room when the smartphone receives the phone call while the TV is being watched in the living room at home.

SUMMARY

One or more exemplary embodiments provide electronic apparatuses and methods for differentially adjusting sound intensities of peripheral devices by connecting an electronic device to the peripheral devices by wire or wirelessly to form a network and recording sounds generated from the peripheral devices connected to the network.

According to an aspect of an exemplary embodiment, there is provided an electronic apparatus including: a microphone; a communicator configured to communicate with an external device; and a controller configured to generate sound data based on a sound input to the microphone, receive audio data from the external device through the communicator, the audio data corresponding to a sound output from the external device, and control to transmit, through the communicator, a command to the external device to adjust an intensity of the sound output from the external device based on a result of comparison between the sound data and the audio data.

The controller may be configured to request the external device to provide state information, the state information including at least one of information about the intensity of the sound output from the external device and information about an operation mode of the external device.

The controller may be configured to generate the sound data in response to receiving a request for a call from another external device through the communicator.

The audio data may be generated by converting the sound output from the external device into an electric signal The controller may be configured to control the communicator to transmit the command to reduce a number of revolutions of a motor included in the external device.

In response to receiving a request for a call from another external device through the communicator, the controller may be configured to control a ringtone to be generated after the command is transmitted to the external device.

In response to a change in the result of the comparison between the sound data and the audio data, the controller may be configured to transmit a second command to the external device to readjust the intensity of the sound output from the external device.

The audio data may be generated based on a sound generated due to a revolution of a motor included in the external device.

According to an aspect of another exemplary embodiment, there is provided an electronic apparatus including: a microphone; a communicator configured to communicate with an external device; and a controller configured to extract identification information of the external device from a sound input to the microphone, determine the external device based on the identification information, and control to transmit, through the communicator, a command to the external device to adjust an intensity of a sound output from the external device.

According to an aspect of still another exemplary embodiment, there is provided an electronic apparatus including: a communicator configured to communicate with a first external device and a second external device; and a controller configured to receive, from the first external device, sound data generated based on a sound output from the second external device through the communicator, receive audio data from the second external device, the audio data corresponding to the sound output from the second external device, and transmit, through the communicator, a command to the second external device to adjust an intensity of the sound output from the second external device based on a result of comparison between the sound data and the audio data.

The command may be transmitted to the second external device through the first external device.

Hierarchical orders may be preset between the electronic apparatus and the second external device, and a hierarchical order of the second external device may be lower than a hierarchical order of the electronic apparatus.

According to an aspect of still another exemplary embodiment, there is provided a method of adjusting an intensity of a sound output from an external device in an electronic apparatus including a microphone, the method including: generating sound data based on a sound input to the microphone; receiving audio data from the external device, the audio data corresponding to the sound output from the external device; and transmitting a command to the external device to adjust the intensity of the sound output from the external device based on a result of comparison between the sound data and the audio data.

The generating may include generating the sound data in response to receiving a request for a call from another external device.

The method may further include, in response to receiving a request for a call at the electronic apparatus, controlling a ringtone to be generated in the electronic apparatus after the transmitting the command is performed.

According to an aspect of still another exemplary embodiment, there is provided a method of adjusting an intensity of a sound output from an external device in an electronic apparatus including a microphone, the method including: extracting identification information of the external device from a sound input to the microphone; determining the external device based on the identification information; and transmitting a command to the external device to adjust the intensity of the sound output from the external device.

According to an aspect of still another exemplary embodiment, there is provided a method of adjusting an intensity of a sound of a first external device in an electronic apparatus, the method including: receiving sound data generated based on a sound output from the first external device, from a second external device; receiving audio data from the first external device, the audio data corresponding to the sound output from the first external device; and transmitting a command to the first external device to adjust the intensity of the sound output from the first external device based on a result of comparison between the sound data and the audio data.

According to an aspect of still another exemplary embodiment, there is provided a method of adjusting an intensity of a sound of an external device in an electronic apparatus including a microphone, the method including: generating sound data based on a sound input to the microphone; receiving a plurality of audio data from a plurality of external devices, the plurality of audio data corresponding to sounds output from the plurality of external devices, respectively; determining at least one external device from among the plurality of external devices based on a result of comparison between the sound data and the plurality of audio data; and transmitting a command to the at least one external device to adjust an intensity of a sound output from the at least one external device.

The method may further include receiving state information of the at least one external device from the at least one external device, the state information including at least one of information about the intensity of the sound output from the at least one external device and information about an operation mode of the at least one external device.

The method may further include, in response to a change in the result of the comparison between the sound data and the audio data, transmitting a second command to readjust for re-adjusting the intensity of the sound output from the at least one external device.

According to an aspect of still another exemplary embodiment, there is provided an electronic apparatus including: a sensor configured to sense a first intensity level of an ambient sound; and a controller configured to obtain a second intensity level of a sound output from an external device and control to adjust the second intensity level based on comparison between the first intensity level and the second intensity level.

The controller may be configured to control to adjust the second intensity level in response to a proportion of the second intensity level to the first intensity level being a predetermined percentage or more.

The controller may be configured to obtain the second intensity level of the sound output from the external device by receiving, from the external device, audio data that is being reproduced by the external device.

The controller may be configured to obtain the second intensity level of the sound output from the external device by receiving, from the external device, audio data that is generated by recording the sound output from the external device and converting the recorded sound into an electric signal

BRIEF DESCRIPTION OF THE DRAWINGS

The above and/or other aspects will be more apparent by describing certain example embodiments with reference to the accompanying drawings in which:

FIG. 6 is a diagram illustrating an example of a hierarchical list indicating a hierarchical structure between an electronic device and an external device;

FIG. 9 is a diagram illustrating an example of a hierarchical list including sound level information;

DETAILED DESCRIPTION

Figure 1:
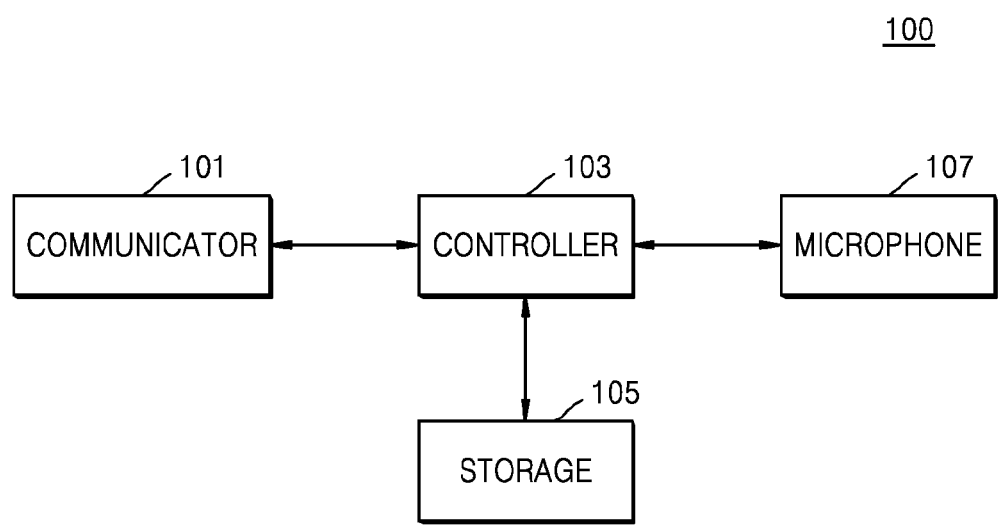
FIG. 1 is a block diagram illustrating an electronic device according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms (modifications, equivalents, and/or alternatives) and are not to be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

An expression "have," "may have," "include," "may include," or the like used in the present document is intended to indicate the presence of a corresponding feature (e.g., a number, a function, an operation, or a constitutional element such as a component), and it should be understood that additional features are not excluded.

In the present disclosure, an expression "A or B," "A and/or B," or "one or more of A and/or B," or the like may include all possible combinations of items enumerated together. For example, "A or B," "at least one of A and B," or "at least one of A or B" may indicate all cases in which (1) at least one A is included, (2) at least one B is included, and (3) at least one A and at least one B are both included.

Although expressions may be used in various embodiments of the present document such as "1st," "2nd," "first," "second" or the like to express various constitutional elements, they are not intended to limit an order and/or importance thereof. The above expressions may be used to distinguish one element from another element. For example, a 1st user device and a 2nd user device may indicate different user devices irrespective of an order or importance thereof. For example, a 1st element may be termed a 2nd element, and similarly, a 2nd element may be termed a 1st element without departing from the scope of the present disclosure.

When a certain element (e.g., a 1st element) is mentioned as being "operatively or communicatively coupled with/to" or "connected to" a different element (e.g., a 2nd element), it is to be understood that the certain element is directly coupled with/to the different element or may be coupled with/to the different element via another element (e.g., a 3rd constitutional element). On the other hand, when a certain element (e.g., a 1st element) is mentioned as being "directly coupled with/to" or "directly connected to" a different element (e.g., a 2nd element), it may be understood that no other element (e.g., no 3rd constitutional element) is present between the certain element and the different element.

An expression "configured to" used in the present document may be interchangeably used with, for example, "suitable for," "having the capacity to," "designed to," "adapted to," "made to," or "capable of" according to a situation. The term "configured to" may not imply only "specially designed to" in a hardware manner. Instead, in certain situations, an expression "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., a central processing unit (CPU) or an application processor) capable of performing corresponding operations by executing one or more software programs stored in a memory device.

Terms used in the present disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art to which various embodiments of the present disclosure belong. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the various embodiments of the present disclosure.

An electronic device and an external device according to various exemplary embodiments of the present document, for example, may include at least one of a smartphone, a table personal computer (PC), a mobile phone, a video phone, an e-book reader, a desktop PC, a laptop PC, a netbook computer, a workstation server, a personal digital assistant (PDA), a portable multimedia player (PMP), an MPEG audio layer 3 (MP3) player, a medical mobile device, a camera, and a wearable device. According to various exemplary embodiments, the wearable device may be implemented in at least one of an accessory type (e.g., a watch, a ring, a bracelet, an anklet, a necklace, glasses, a contact lens, or a head-mounted-device (HMD)), a fabric or clothing integration type (e.g., an electronic garment) a body attachment type (e.g., a skin pad or a tattoo), and a bio-implantable type (e.g., an implantable circut).

In some exemplary embodiments, the electronic device and the external device may be home appliances. The home appliance, for example, may include at least one of a television (TV), a digital video disk (DVD) player, an audio device, a refrigerator, an air conditioner, a cleaner, an oven, a microwave, a washer, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic picture frame.

In other exemplary embodiments of the present document, the electronic device and the external device, for example, may include at least one of various medical devices (e.g., various portable medical measurement devices (a glucometer, a heart rate meter, a blood pressure meter, a temperature gauge, a magnetic resonance angiography (MRA) device, a magnetic resonance imaging (MRI) device, a computed tomography (CT) device, a shooting device, an ultrasonic machine, etc.), a navigation device, a satellite navigation system (global navigation satellite system (GNSS)), an event data recorder (EDR), a flight data recorder (FDR), a car infotainment device, a marine electronic device (e.g., a marine navigation device, a gyro compass, or the like), avionics, a security device, a car head unit, an industrial or home robot, an automated teller machine (ATM) of a banking facility, a point of sales (POS) terminal of a shop, and Internet of things (e.g., a bulb, various sensors, an electric or gas meter, a sprinkler system, a fire alarm, a thermostat, a street light, a toaster, an exerciser, a hot water tank, a heater, a boiler, etc.).

In some exemplary embodiments, the electronic device and the external device may include at least one of a part of furniture or a building/structure, an electronic board, an electronic signature receiving device, a projector, and various measurement devices (for example, water, electricity, gas, and electric wave measuring devices). In various exemplary embodiments, each of the electronic device and the external device may be one of the above-described devices and a combination of the devices. According to some exemplary embodiments, the electronic device and the external device may be flexible electronic devices. In addition, the electronic device and the external device according to an exemplary embodiment of the present document are not limited to the above-described devices and may include new electronic devices according to the development of technologies.

Sound data according to various exemplary embodiments of the present document, for example, may include a sound file indicating a sound and a graph indicating sound characteristics. In addition, audio data, for example, may include an audio file or a graph indicating audio characteristics.

Hereinafter, the electronic device and the external device according to various exemplary embodiments will be described with reference to the accompanying drawings. In the present document, the term "user" may indicate a person who uses the electronic device and the external device or a device (e.g., an artificial intelligence electronic device) which uses the electronic device and the external device.

FIG. 1 is a block diagram illustrating an electronic device 100 according to an exemplary embodiment.

Referring to FIG. 1, the electronic device 100 may include a microphone 107, a communicator 101, a controller 103, and a storage 105.

The microphone 107 may convert a sound input near the electronic device 100 into an electric signal. The sound input to the microphone 107 is converted into the electric signal, the electric signal is converted into digital data, and the digital data may be stored in a storage 105. The sound is converted into sound data and the sound data may be stored in the storage 105 through a recording process.

The microphone 107 may be embedded in the electronic device 100 or provided in the form of a separate accessory and connected to the electronic device 100.

The communicator 101 may perform communication between the electronic device 100 and an external device or a server. For example, the communicator 101 is connected to a network through wireless or wired communication and may communicate with the external device or the server. The external device may be another electronic device having a communication function. The communicator 101 may receive audio data from the external device.

For the wireless communication, Long-Term Evolution (LTE), LTE Advanced (LTE-A), code division multiple access (CDMA), wideband CDMA (WCDMA), Universal Mobile Telecommunications System (UMTS), Wireless Broadband (WiBro), Global System for Mobile Communications (GSM), etc. may be used as a cellular communication protocol. In addition, the wireless communication may include short-range communication. The short-range communication, for example, may include wireless fidelity (WiFi), Bluetooth, near field communication (NFC), etc.

The wired communication, for example, may include communication of at least one of Universal Serial Bus (USB), High-Definition Multimedia Interface (HDMI), recommended standard 232 (RS-232), plain old telephone service (POTS), etc.

The communicator 101, for example, may include a cellular module, a WiFi module, a Bluetooth module, a GNSS module (e.g., a global positioning system (GPS) module, a Glonass module, a Beidou module, or a Galileo module), an NFC module, and a radio frequency (RF) module. The cellular module, for example, may provide voice communication, video communication, a short message service, an Internet service, etc. According to an exemplary embodiment, the cellular module may identify and authenticate the electronic device 100 within the communication network using a subscriber identification module (SIM) (e.g., a SIM card). According to an exemplary embodiment, the cellular module may perform at least some of functions capable of being provided by the controller 103. According to an exemplary embodiment, the cellular module may include a communication processor (CP).

The WiFi module, the Bluetooth module, the GNSS module, or the NFC module, for example, may include a process for processing data to be transmitted and received through a corresponding module. According to some exemplary embodiments, at least some modules (e.g., two or more modules) of the cellular module, the WiFi module, the Bluetooth module, the GNSS module, and the NFC module may be included within one integrated chip (IC) or IC package.

The RF module, for example, may transmit and receive a communication signal (e.g., an RF signal). The RF module, for example, may include a transceiver, a power amplifier module (PAM), a frequency filter, a low noise amplifier (LNA), an antenna, or the like. According to another exemplary embodiment, at least one of the cellular module, the WiFi module, the Bluetooth module, the GNSS module, and the NFC module may transmit and receive an RF signal through a separate RF module.

The SIM, for example, may include a card having a SIM and/or an embedded SIM and include unique identification information (e.g., an integrated circuit card identifier (IC-CID)) or subscriber information (e.g., an international mobile subscriber identity (MI)).

The storage 105, for example, may include an internal memory or an external memory. The internal memory, for example, may include at least one of a volatile memory (e.g., a dynamic RAM (DRAM), a static RAM (SRAM), a synchronous dynamic RAM (SDRAM), etc.), a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, and a solid state drive (SSD).

The external memory may further include a flash drive, e.g., compact flash (CF), Secure Digital (SD), micro-SD, mini-SD, extreme digital (xD), a multimedia card (MMC), a memory stick, or the like. The external memory may be functionally and/or physically connected to the electronic device through various interfaces.

The storage 105 may record and store sound data generated based on a sound input through the microphone 107. In addition, the storage 105 may store information of the external device. For example, the storage 105 may store identification (ID) data and state information of the external device currently being controlled by the electronic device 100. The state information of the external device, for example, may include information about an intensity of a sound generated from the external device and operation mode information indicating an operation mode of the external device.

The storage 105, for example, may store commands or data related to one or more other components of the electronic device 100. According to an exemplary embodiment, the storage 105 may store software and/or a program. The program, for example, may include a kernel, middleware, an application programming interface (API), and/or an application program (or an "application" or "app"). At least some of the kernel, the middleware, and the API may be referred to as an operating system (OS).

The controller 103 may be one or more of a CPU, an application processor (AP), and a communication processor (CP). The controller 103, for example, may execute calculation or data processing related to control and/or communication of one or more other components of the electronic device 100.

The controller 103 may generate sound data based on a sound input to the microphone 107, record the sound data and store the sound data in the storage 105. The controller 103 may receive audio data from the external device through the communicator 101, identify the external device based on the sound data and the audio data, and control a command for adjusting an intensity of a sound generated by the external device to be transmitted through the communicator 101.

The command for adjusting the intensity of the sound generated by the external device may be data for controlling the external device and may be used to adjust an intensity of a sound output from the external device. When the external device receives the command for adjusting the intensity of the sound from the electronic device 100, it is possible to decrease the intensity of the sound generated from the external device or re-adjust the decreased sound intensity to the original intensity. For example, when the external device is a TV, the intensity of the sound output from the TV may decrease or increase.

In addition, the command for adjusting the intensity of the sound of the external device may be used to reduce the number of revolutions of a motor of the external device. For example, when the external device is operated due to revolution of the motor such as in a washer or a cleaner, the sound generated from the external device may be generated due to the revolution of the motor. Accordingly, the external device may decrease the number of revolutions of the motor to decrease the sound generated from the external device.

When the external device is identified, the controller 103 may request the identified external device to provide state information. When a request for a phone call is received through the communicator 101, the controller 103 may generate data of a sound near the electronic device 100. After the command for adjusting the intensity of the sound of the external device is transmitted, the controller 103 may control a ringtone of the electronic device 100 to be generated. For example, when the user's smartphone receives a phone call request while the user watches the TV, the smartphone may record an ambient sound through the microphone 107 before the ringtone is generated and generate the ringtone after a command for reducing the intensity of the sound of the TV is transmitted.

Figure 2:
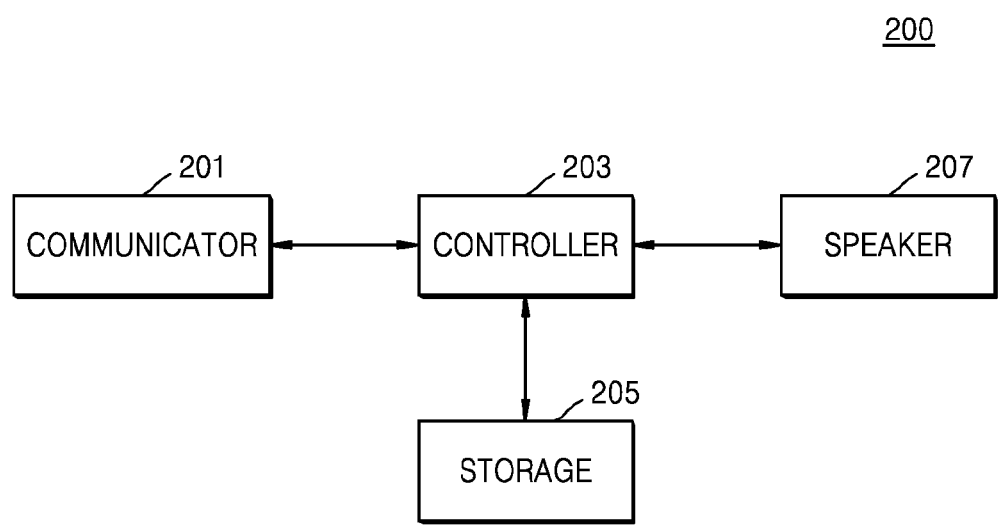
FIG. 2 is a block diagram illustrating an external device according to an exemplary embodiment.

FIG. 2 is a block diagram of an external device 200 according to an exemplary embodiment. The external device 200 of FIG. 2 may include a speaker 207.

Referring to FIG. 2, the external device 200 may include a communicator 201, a storage 205, the speaker 207, and a controller 203. The external device 200 may be connected to the electronic device 100 through wired or wireless communication and controlled by the electronic device 100.

The communicator 201 communicates with the electronic device 100 and may transmit audio data reproduced by the external device 200 to the electronic device 100 or receive data from the electronic device 100. The audio data may be stored in the storage 205 or received from a broadcasting station or a server. Because the communicator 201 is similar to the communicator 101 described with reference to FIG. 1, detailed description thereof will be omitted.

The speaker 207 may output a sound corresponding to the audio data.

The storage 205 may store the audio data. In addition, the storage 205 may store state information of the external device 200. The state information may include information about the intensity of the sound generated by the external device 200 and the operation mode of the external device 200.

The controller 203 may control each block or function of the external device 200 and receive a command from the electronic device 100 through the communicator 201 and control a function of the external device 200 in response to the received command. For example, when the command for adjusting the intensity of the sound is received from the electronic device 100, the controller 203 may control the intensity of the sound to be output from the external device 200 to be adjusted. In addition, when a command for re-adjusting the intensity of the sound is received from the electronic device 100, the controller 203 may re-adjust the intensity of the sound to be output from the external device 200. For example, the controller 203 may re-adjust the intensity of the sound to be output from the external device 200 to the original intensity.

The external device 200 may output the audio data as a sound through the speaker 207 and transmit the audio data to the electronic device 100 through the communicator 201.

Figure 3:
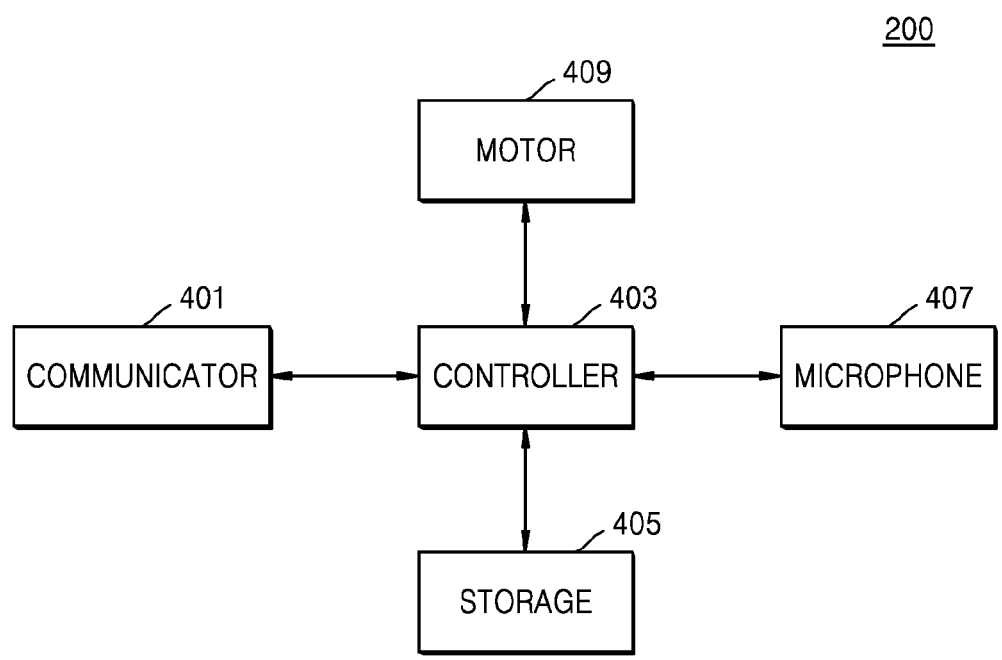
FIG. 3 is a block diagram illustrating an external device without a speaker according to an exemplary embodiment.

FIG. 3 is a block diagram illustrating an external device 200 without a speaker according to another exemplary embodiment. The external device 200 may include a communicator 401, a storage 405, a microphone 407, a controller 403, and a motor 409. The external device 200 does not have a sound generating speaker, but may generate a sound due to the revolution of the motor 409 included in the external device 200. For example, the external device 200 may include a cleaner or a washer. When the external device 200 is the cleaner, a sound may be generated from the cleaner due to vibration caused by the revolution of the motor in the cleaner. The generated sound may interrupt a phone call on the smartphone.

The communicator 401 communicates with the electronic device 100 and may transmit data to the electronic device 100 or receive data from the electronic device 100. Because the communicator 401 is similar to the communicator 101 described with reference to FIG. 1, detailed description thereof will be omitted.

The storage 405 may store audio data. The audio data may be generated by converting a sound generated from the external device 200 into an electric signal through the microphone 407 and the generated audio data may be stored in the storage 405. Because other details of the storage 405 are similar to those of the storage 105 described with reference to FIG. 1, detailed description thereof will be omitted.

The controller 403 may control each block or function of the external device 200 and receive a control command from the electronic device 100 through the communicator 401 to control the function of the external device 200 in response to the received control command. In addition, the controller 403 may control the number of revolutions of the motor 409. For example, when a control command for adjusting the intensity of the sound from the electronic device 100 is received, the external device 200 may operate in a low-noise mode according to the control command or reduce the number of revolutions of the motor 409 within the external device 200.

The external device 200 may operate in the low-noise mode according to the controller 403 or the user's input. When the external device 200 operates in the low-noise mode, the number of revolutions of the motor 409 within the external device 200 may decrease and an intensity of a sound generated due to the revolution of the motor may decrease.

The number of revolutions of the motor 409 may be adjusted according to control of the controller 403.

The microphone 407 may convert the sound generated due to the revolution of the motor 409 into an electric signal.

The controller 403 may generate and record audio data from the sound of the external device 200 converted into the electric signal and store the audio data in the storage 405. In addition, the controller 403 may transmit the audio data to the electronic device 100 through the communicator 401 according to a request of the electronic device 100. The microphone 407 may be included in the external device 200 or separately provided.

In addition, the external device 200 may have an interface connectable to the microphone 407 that is separately provided from the external device 200.

Figure 4:
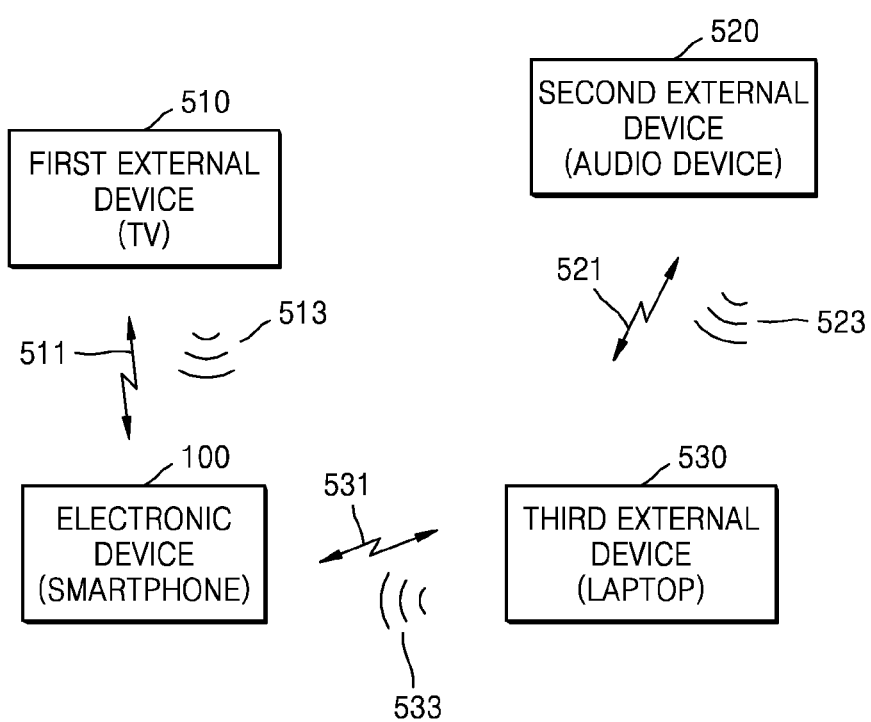
FIG. 4 is a diagram illustrating an example in which an electronic device adjusts an intensity of a sound generated from an external device.
Figure 5:
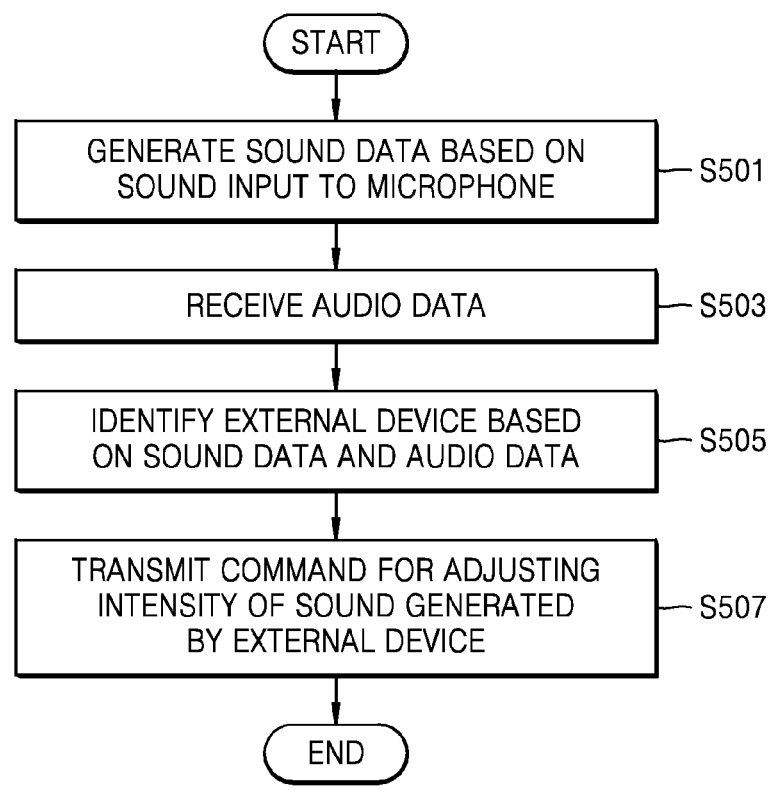
FIG. 5 is a flowchart illustrating a process in which an electronic device adjusts an intensity of a sound generated from an external device.

FIG. 4 is a diagram illustrating an example in which the electronic device 100 adjusts an intensity of a sound generated from the external device 200 according to an exemplary embodiment. FIG. 5 is a flowchart illustrating a process in which the electronic device 100 adjusts the intensity of the sound generated from the external device 200. Hereinafter, description will be given with reference to FIGS. 4 and 5.

Referring to FIG. 4, the electronic device 100 and a plurality of external devices, i.e., first to third external devices 510, 520, and 530 are illustrated. The external device 510, 520, or 530 may correspond to the external device 200 as shown in FIG. 2 or FIG. 3. In addition, the electronic device 100 may be a smartphone. The electronic device 100 may include the microphone 107 and record sounds 513, 523, and 533 near the electronic device 100 through the microphone 107. The sounds 513, 523, and 533 may be generated from the plurality of external devices 510, 520, and 530, respectively. Alternatively, the electronic device 100 may receive audio data 511, 521, and 531 transmitted from the external devices 510, 520, and 530 through the communicator 101.

The external device 510, 520, or 530 is located near the electronic device 100 and the sound generated from the external device 510, 520, or 530 may affect the electronic device 100 or the user of the electronic device 100. For example, during the phone call on the smartphone 100, a sound generated from the first external device 510 (e.g., a TV), the second external device 520 (e.g., an audio device), and the third external device 530 (e.g., a laptop computer) located near the smartphone 100 may affect the phone call using the smartphone 100. At this time, an extent to which the external devices 510-530 affect the electronic device 100 may differ according to a distance between the electronic device 100 and each of the external devices 510-530.

For example, the TV 510 located at a shorter distance from the electronic device 100 may affect the electronic device 100 or the user of the electronic device 100 at a greater extent, but the audio device 520 located at a longer distance from the electronic device 100 may not affect the electronic device 100 or the user of the electronic device 100 at a greater extent. In particular, for example, when the external device 510, 520, or 530 is located in a different room from the electronic device 100, the sound generated from the external device 510, 520, or 530 may not substantially affect the electronic device 100 or the user of the electronic device 100. In addition, when the sound generated from the external device 200 is smaller even when the distance between the electronic device 100 and the external device 200 is shorter, the sound generated from the external device 200 may not substantially affect the electronic device 100 or the user of the electronic device 100. For example, even when the distance from the electronic device 100 is shorter, the speaker of the laptop computer 530 may have a smaller output, and the sound generated from the laptop computer 530 may not substantially affect the electronic device 100 or the user of the electronic device 100.

The electronic device 100 may record an ambient sound input to the microphone 107 and identify the external device 200 which affects the electronic device 100 or the user of the electronic device 100. In detail, the controller 103 may generate sound data based on the input to the microphone 107 (S501). When there are a plurality of external devices 200 near the electronic device 100, sounds generated from the plurality of external devices 200 may be input through the microphone 107, but the electronic device 100 may identify the external device 200 that generates a sound input at a predetermined intensity or more. For example, when the TV 510 and the laptop computer 530 are located near the electronic device 100, the sounds generated from the TV 510 and the laptop computer 530 are input to the electronic device 100 through the microphone 107, but the electronic device 100 may generate sound data by processing only the sound generated from the TV 510 because the sound output from the speaker of the laptop computer 530 is less than the predetermined intensity.

The electronic device 100 may receive audio data transmitted to the electronic device 100 by the external device 200 (S503) and identify the external device 200 based on the sound data generated by the electronic device 100 and the received audio data (S505).

The electronic device 100 may identify the external device 200 by comparing the sound data generated based on the sound input through the microphone 107 with the received audio data. In detail, the electronic device 100 may generate sound data by converting the sound input to the microphone 107 into digital data to record the sound data and store the sound data in the storage 105.

In addition, the electronic device 100 may receive audio data from the external device 200 connected to the network. The audio data may be data corresponding to the sound output from the external device 200. The external device 200 may process the audio data to output the processed audio data to the speaker 207 and generate a sound from the processed audio data. Alternatively, the external device 200 may generate the audio data by recording a sound physically generated from the external device 200 through the microphone 407 of the external device 200.

The sound output through the speaker 207 or the sound physically generated from the external device 200 may be input to the electronic device 100 through the microphone 107. The electronic device 100 compares the sound data input through the microphone 107 with the audio data received from the external device 200. When the sound data is the same as or similar to the audio data, the electronic device 100 may transmit a control command for adjusting the intensity of the sound generated from the external device 200 to the external device 200 (S507). For example, the electronic device 100 may determine that the sound data is similar to the audio data when an intensity level corresponding to the audio data occupies a certain percentage or more of an intensity level corresponding to the sound data.

The external device 200 receives the control command for adjusting the intensity of the sound from the electronic device 100 and may decrease or increase an intensity of a sound of the external device 200 according to the received control command. For example, when the external device 200 does not have a speaker, but generates a sound due to the revolution of the motor, the external device 200 may decrease or increase the intensity of the sound generated from the external device 200 by decreasing or increasing the number of revolutions of the motor. For example, when the external device 200 is the washer or the cleaner, the external device 200 may decrease or increase the number of revolutions of the motor included in the washer or the cleaner when the command for adjusting the intensity of the sound is received from the electronic device 100.

Before a ringtone is generated in response to receiving a phone call request, the electronic device 100 may adjust the intensity of the sound of the external device 200 and display an object (e.g., an icon, text, an image, or the like) for call request reception notification on the screen of the external device 200. When the phone call request is received, the electronic device 100 may generate the sound data from the sound input through the microphone 107. That is, the electronic device 100 may record an ambient sound through the microphone 107 using a call request reception signal as a trigger. In detail, the controller 103 may control the sound input through the microphone 107 to be recorded when the phone call request is received through the communicator 101.

The electronic device 100 may identify the external device 200 which generates the sound and transmit a control command for adjusting the intensity of the sound generated by the external device 200 to the identified external device 200. In addition, the electronic device 100 may request the identified external device 200 to provide information about the intensity of a currently output sound and store the sound intensity information received from the external device 200 in the storage 105.

At this time, when the external device 200 is a device for generating a sound through the speaker 207, the external device 200 may decrease the intensity of the sound output from the external device 200. When the external device 200 is a device for generating the sound due to the revolution of the motor 409 without a speaker, the external device 200 may decrease the number of revolutions of the motor 409.

After the electronic device 100 transmits the control command for adjusting the sound generated by the external device 200 to the external device 200, the ringtone of the electronic device 100 may be generated. Accordingly, the user may answer the phone using the electronic device 100 after hearing the ringtone in a state in which the sound of the external device 200 is reduced. In addition, when the phone call ends, the electronic device 100 may transmit a control command for restoring the intensity of the sound of the external device 200 to the original state to the external device 200. In detail, the electronic device 100 may transmit the command for adjusting the intensity of the sound of the external device 200 based on sound intensity information of the external device 200 stored in the storage 105. The sound intensity information of the external device 200 may be preset information indicating an intensity of a sound to which the external device 200 is adjusted.

For example, when the user sets the intensity of the sound of the TV to a volume level "10" and a phone call request is received while the TV is watched, the electronic device 100 may generate the ringtone after adjusting the intensity of the sound of the TV to a lower volume level, for example, zero before the ringtone is generated. When the phone call ends, the electronic device 100 may restore the intensity of the sound of the TV to the volume level "10".

An example in which the electronic device 100 adjusts an intensity of a sound of the external device 200 has been described above, but exemplary embodiments are not limited thereto. The electronic device 100 may adjust an intensity of a sound (for example, a ringtone and/or a dialing sound) output from the electronic device 100. For example, the electronic device 100 may not adjust the intensity of the sound of the external device 200, but instead the electronic device 100 may increase the intensity of the sound output from the electronic device 100. In this case, the electronic device 100 may measure an intensity of ambient noise and increase the intensity of the sound to be output from the electronic device 100 based on the measured noise intensity.

An example in which one electronic device 100 adjusts an intensity of a sound of the external device 200 has been described above, but exemplary embodiments are not limited thereto. For example, a first user may use a first electronic device (not illustrated) and a second user may use a second electronic device (not illustrated), and the first and second users may not desire to be interrupted by any ambient noise. In this case, the intensity of the sound of the external device 200 may be adjusted based on priorities of the first electronic device (not illustrated) and the second electronic device (not illustrated) for controlling the external device 200. For example, when the priority of the first electronic device (not illustrated) is higher than the priority of the second electronic device (not illustrated), the intensity of the sound of the external device 200 and the intensity of the sound of the second electronic device (not illustrated) may be adjusted so that the first electronic device (not illustrated) or the first user is not affected by the ambient noise. In this case, the first electronic device (not illustrated), the second electronic device (not illustrated), and the external device 200 may mutually perform communication through the network. In addition, the priorities of the devices, for example, may be preset according to a hierarchical structure, an example of which is described below.

FIG. 6 is a diagram illustrating an example of a hierarchical list indicating a hierarchical structure between an electronic device 100 and an external device 200.

When a plurality of electronic devices 100 and the external device 200 simultaneously generate sounds, a higher-order layer device in a hierarchical list 650 may automatically control an intensity of a sound of a lower-order layer device. For example, when the hierarchical structure is configured in the order of a smartphone 601, a laptop computer 603, a TV 605, and an audio device 607, the smartphone 601 may adjust the sound intensities of the laptop computer 603, the TV 605, and the audio device 607 of lower-order layers. The laptop computer 603 may adjust the sound intensities of the TV 605 and the audio device 607 of the lower-order layers. The TV 605 may adjust the intensity of the sound of the audio device 607 of the lower-order layer. The hierarchical list 650 may be stored in the electronic device 100 and the external device 200. Accordingly, each of the electronic device 100 and the external device 200 may determine a hierarchical position thereof and determine another device that is in a lower hierarchical position to be controlled.

When the external device 200 of the lower-order layer generates the sound, the higher-order layer device may record the sound generated by the external device 200 of the lower-order layer using the microphone, identify the external device 200 of the lower-order layer, and automatically adjust the intensity of the sound of the external device 200 of the lower-order layer.

For example, when the user views a movie in the laptop computer 603, the laptop computer 603 records the sound generated from the TV 605 or the audio device 607 using the embedded microphone. The laptop computer 603 may analyze the recorded sound, identify a noise level from the TV 605, and transmit a command for decreasing the sound intensity to the TV 605.

When the higher-order layer device does not have the microphone, it is possible to record the sound generated by the external device 200 of the lower-order layer using another device having the microphone and identify the external device 200 of the lower-order layer.

Figure 7:
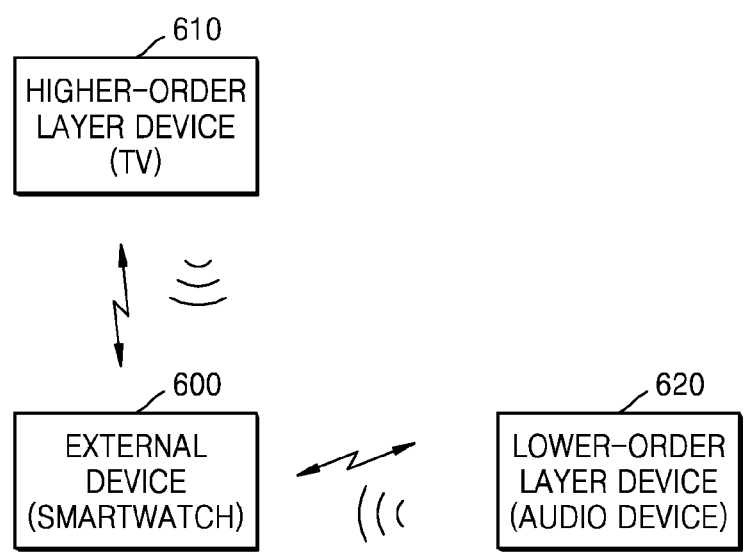
FIG. 7 is a diagram illustrating an example in which a higher-order layer device without a microphone adjusts an intensity of a sound of a lower-order layer device.
Figure 8:
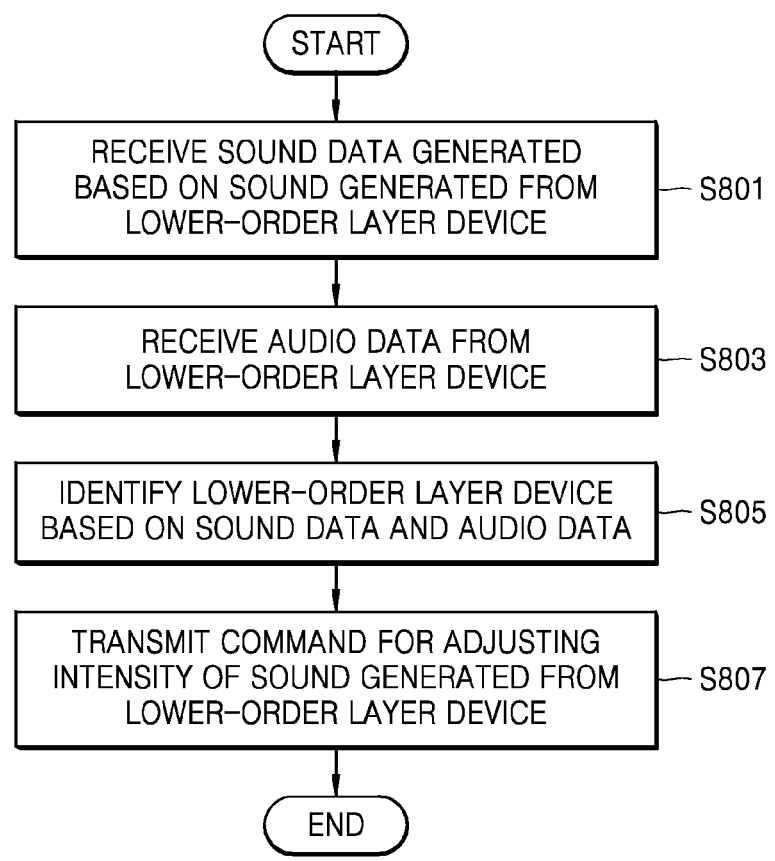
FIG. 8 is a flowchart illustrating a process in which a higher-order layer device without a microphone adjusts an intensity of a sound of a lower-order layer device.

FIG. 7 is a diagram illustrating an example in which a higher-order layer device 610 without a microphone adjusts an intensity of a sound of a lower-order layer device 620. FIG. 8 is a flowchart illustrating a process in which the higher-order layer device 610 without the microphone controls the intensity of the sound of the lower-order layer device 620.

Referring to FIGS. 7 and 8, the higher-order layer device 610 without the microphone may identify the lower-order layer device 620 using the external device 600 having the microphone.

Referring to FIG. 7, the higher-order layer device 610, the lower-order layer device 620, and the external device 600 are illustrated. The higher-order layer device 610 may receive sound data, which is generated based on a sound generated from the lower-order layer device 620, from the external device 600 through the communicator (S801). The higher-order layer device 610 may identify the peripheral lower-order layer device 620 and the external device 600, which is used to record the sound generated from the lower-order layer device 620. In addition, the higher-order layer device 610 may request the external device 600 to record the sound of the lower-order layer device 620. In response to the request from the higher-order layer device 610, the external device 600 may generate the sound data by recording the sound generated from the lower-order layer device 620 through the microphone of the external device 600 and transmit the generated sound data to the higher-order layer device 610.

In addition, the higher-order layer device 610 may receive audio data from the lower-order layer device 620 (S803). The higher-order layer device 610 may directly receive audio data from the lower-order layer device 620 or receive the audio data through the external device 600.

In addition, the higher-order layer device 610 may identify the lower-order layer device 620 based on the sound data and the audio data (S805) and transmit a control command for adjusting the intensity of the sound generated from the lower-order layer device 620 to the lower-order layer device 620 (S807). The higher-order layer device 610 may directly transmit the control command to the lower-order layer device 620.

In addition, the higher-order layer device 610 may transmit the control command to the lower-order layer device 620 through the external device 600. The higher-order layer device 610 may transmit the control command for adjusting the intensity of the sound generated from the lower-order layer device 620 to the external device 600 and enable the external device 600 to adjust the intensity of the sound of the lower-order layer device 620. In this case, before the control command for adjusting the intensity of the sound generated from the lower-order layer device 620 is transmitted to the lower-order layer device 620, the external device 600 may compare the sound of the higher-order layer device 610 with the sound of the lower-order layer device 620.

In addition, the external device 600 may control at least one of the sound of the higher-order layer device 610 and the sound of the lower-order layer device 620 based on a comparison result. For example, when the user wants to listen to the sound of the higher-order layer device 610 and does not want to listen to the sound of the lower-order layer device 620, the external device 600 used by the user may compare the sound of the higher-order layer device 610 with the sound of the lower-order layer device 620 and the external device 600 may increase the intensity of the sound of the higher-order layer device 610 and decrease the intensity of the sound of the lower-order layer device 620.

The higher-order layer device 610, for example, may be a TV without a microphone. The lower-order layer device 620, for example, may be an audio device. The external device 600, for example, may be a wearable device such as a smartwatch.

Because the higher-order layer device 610 without the microphone such as the TV does not measure the intensity of the sound generated from the lower-order layer device 620, it is possible to measure or adjust the intensity of the sound generated from the lower-order layer device 620 using the external device 600 having the microphone, for example, the smartwatch.

An example in which the higher-order layer device 610 is a TV, the lower-order layer device 620 is an audio device, and the external device 600 is a smartwatch will be described below, but exemplary embodiments is not limited thereto. When an ambient sound is recorded using a wearable device such as the smartwatch, it is possible to measure the ambient sound at a position closest to the user. In addition, the wearable device such as the smartwatch has an embedded biosensor, and it may be determined whether the user is wearing the wearable device based on an output of the biosensor. Accordingly, the higher-order layer device 610 may control the lower-order layer device 620 using the wearable device worn by the user.

When the user turns on a power supply of the TV 610, the TV 610 may request another device to send a response signal to the TV 610 in order to identify another device which generates the sound from the network. At this time, the audio device 620 and the smartwatch 600 connected to the network may transmit unique information of the audio device 620 and the smartwatch 600 to the TV 610 so that the TV 610 may identify the audio device 620 and the smartwatch 600 in response to the request from the TV 610. The TV 610 may receive the unique information of the audio device 620 and the smartwatch 600 and recognize that the audio device 620 and the smartwatch 600 are connected to the network.

In addition, the TV 610 may identify an attribute of the smartwatch 600 from the unique information received from the smartwatch 600, and for example, may recognize that the microphone is embedded in the smartwatch 600. The TV 610 may request the smartwatch 600 to record an ambient sound, generate sound data, and transmit the generated sound data to the TV 610. The TV 610 may identify the audio device 620 based on the sound data transmitted from the smartwatch 600 and the audio data transmitted from the audio device 620. That is, the TV 610 may compare the received sound data and audio data and recognize that the audio device 620 generates the sound when a degree of similarity between the received sound data and audio data is greater than or equal to a preset numeric value. Alternatively, the TV 610 may compare the received sound data and audio data and recognize that the audio device 620 generates the sound when an intensity level corresponding to the audio data occupies a certain percentage or more of an intensity level corresponding to the sound data. In addition, the TV 610 may transmit a control command for adjusting the intensity of the sound generated from the audio device 620, to the audio device 620. The audio device 620 may receive the control command from the TV 610 to decrease or increase the intensity of the sound of the audio device 620.

In addition, the external device 600 may compare intensities of sounds generated from the higher-order layer device 610 and the lower-order layer device 620 and transmit a control command for adjusting the intensity of the sound of the lower-order layer device 620 according to a comparison result to the lower-order layer device 620. In this case, the intensity of the sound of the lower-order layer device 620 to be adjusted may be determined according to the intensity of the sound generated from the higher-order layer device 610.

For example, the smartwatch 600 may transmit a command for requesting audio data to the TV 610 and the audio device 620. The smartwatch 600 may receive the audio data transmitted from the TV 610 and the audio device 620. The smartwatch 600 may generate and record sound data from a sound generated through the speaker in the TV 610 and the audio device 620. The smartwatch 600 may identify the TV 610 and the audio data based on the sound data and the audio data. The smartwatch 600 may compare the intensity of the sound generated from the TV 610 with the intensity of the sound generated from the audio device 620 and transmit a command for adjusting the intensity of the sound of the audio device 620 when the intensity of the sound generated from the audio device 620 is greater than the intensity of the sound generated from the TV 610. Alternatively, the smartwatch 60 may send the command for adjusting the intensity of the sound of the audio device 620 to the TV 610 and the TV 610 may adjust the intensity of the sound of the audio device 620 by transmitting a command for adjusting the sound intensity to the audio device 620.

FIG. 9 is a diagram illustrating an example of the hierarchical list including sound level information. Referring to FIG. 9, a hierarchical order and relative sound levels of the electronic device 100 and the external device 200 constituting layers in a hierarchical layer 900 are illustrated. For example, a smartphone 901, a laptop computer 903, a TV 905, and an audio device 907 may be recorded in the hierarchical list. The hierarchical order may be set in the order of the smartphone 901, the laptop computer 903, the TV 905, and the audio device 907. The relative sound levels (or signal ratio) of the electronic device 100 and the external device 200 may be indicated in the hierarchical list.

For example, the sound level of the smartphone 901 may be '1.' The sound level of the laptop computer 903 may be '0.5.' The sound level of the TV 905 may be '0.25.' The sound level of the audio device 907 may be '0.125.'

The sound level may be set by the user and the hierarchical order may be determined according to the relative level intensity. For example, the first hierarchical position may correspond to a sound level of '1.0,' the second hierarchical position may correspond to a sound level of '0.5' which is half the sound level of the first hierarchical position, the third hierarchical position may correspond to a sound level of '0.25' which is half the sound level of the second hierarchical position, and the fourth hierarchical position may correspond to a sound level of '0.125' which is half the sound level of the third hierarchical position.

The electronic device 100 may determine the intensity of the sound of the external device 200 from the sound level intensity included in the hierarchical list and transmit a command for adjusting the intensity of the sound of the external device 200 to the external device 200.

Figure 10:
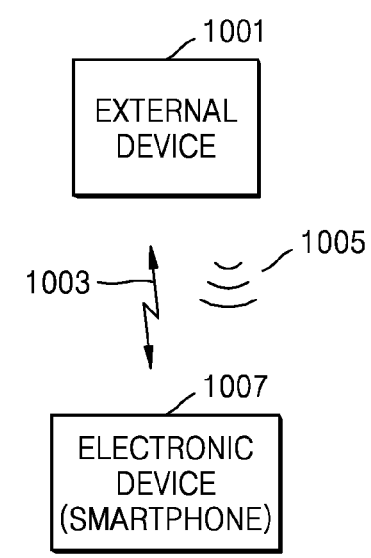
FIG. 10 is a diagram illustrating an example in which an electronic device adjusts an intensity of a sound generated from an external device that does not include a speaker.
Figure 11:
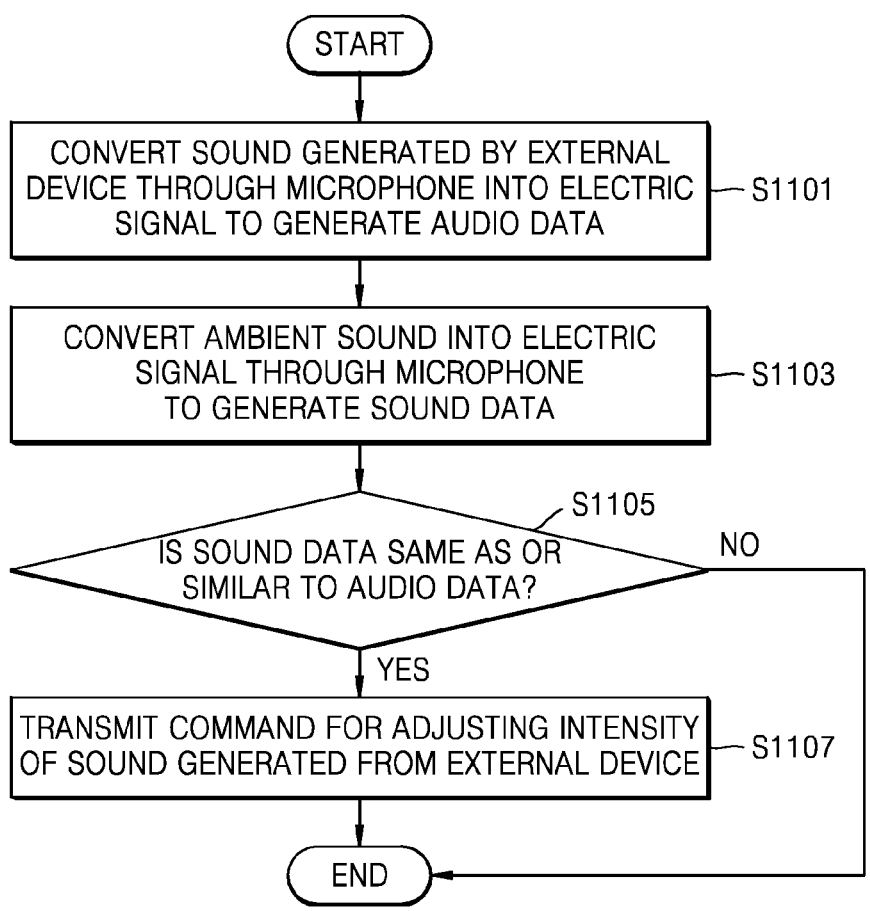
FIG. 11 is a diagram illustrating a process in which an electronic device adjusts an intensity of a sound generated from an external device that does not include a speaker.

FIG. 10 is a diagram illustrating an example in which an electronic device 1007 adjusts the intensity of the sound generated from an external device 1001 without the speaker. FIG. 11 is a diagram illustrating a process in which the electronic device 1007 adjusts the intensity of the sound generated from the external device 1001 without the speaker.

The electronic device 1007 of FIG. 10 may be the electronic device 100 as shown in FIG. 1 and the external device 1001 may be the external device 200 as shown in FIG. 2 or FIG. 3. The electronic device 1007, for example, may be a smartphone. The external device 1001, for example, may be a washer or a cleaner. The external device 1001 does not have a separate speaker, but may generate the sound due to the revolution of the motor. This sound may affect the electronic device 1007 or a user of the electronic device 1007. The electronic device 1007 may reduce the number of revolutions of the motor within the external device 1001 to reduce the sound generated from the external device 1001 or operate the external device 1001 in a low-noise mode. The low-noise mode may be a mode in which the external device 1001 is operated in a state in which the number of revolutions of the motor is reduced to reduce the sound generated from the external device 1001.

The external device 1001 may include a microphone. The external device 1001 generate audio data 1003 by converting the sound generated from the external device 1001 input through the microphone into an electric signal (S1101), record the generated audio data 1003, and store the generated audio data 1003 in the storage. The external device 1001 may transmit audio data 1003 to the electronic device 1007. At this time, the audio data 1003 may be transmitted using wireless communication, for example, Wi-Fi communication. The electronic device 1007 may receive the audio data 1003 transmitted from the external device 1001.

The electronic device 1007 may convert an ambient sound 1005 into an electric signal through the microphone to generate sound data (S1103) and record the generated sound data. The electronic device 1007 determines whether the sound data is the same as or similar to the audio data 1003 by comparing the sound data with the audio data 1003 (S1105). When it is determined that the sound data is the same as or similar to the audio data 1003, a control command for adjusting the sound generated from the external device 1001 may be transmitted to the external device 1001 (S1107).

Figure 12:
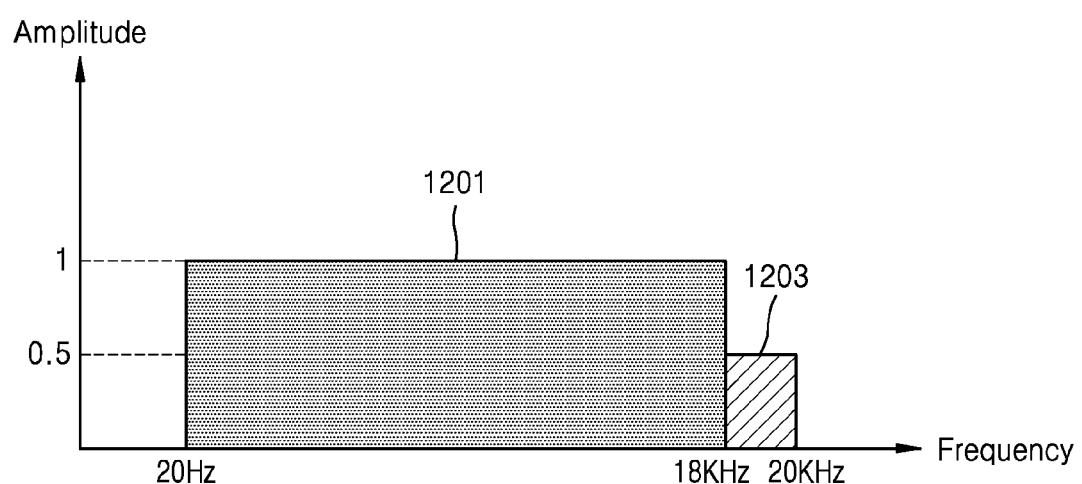
FIG. 12 is a diagram illustrating a frequency domain in which identification information is inserted into a sound generated from an external device.
Figure 13:
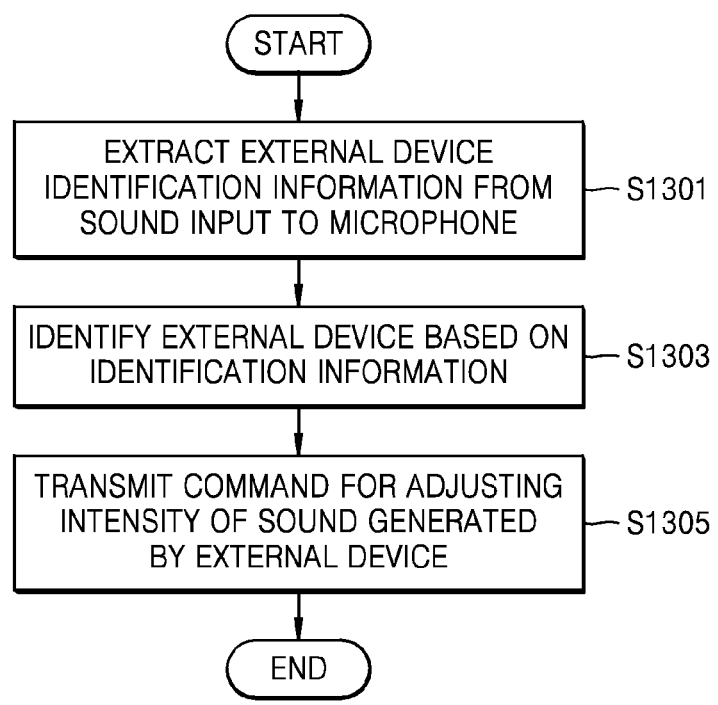
FIG. 13 is a flowchart illustrating a process of processing a sound including identification information of an external device.

FIG. 12 is a diagram illustrating a frequency domain in which identification information is inserted into a sound generated from the external device 200. FIG. 13 is a flowchart illustrating a process in which the electronic device 100 processes a sound including the identification information of the external device 200. Hereinafter, a process of processing the sound including the identification information of the external device 200 will be described with reference to FIGS. 12 and 13.

Referring to FIG. 12, audible frequency bands 1201 and 1203 are illustrated. The external device 200 may insert identification information of the external device 200 into the audible frequency band 1203 in a higher-frequency band and transmit the identification information to the electronic device 100. Sound information may be inserted into the audible frequency band 1201 in a lower-frequency band. The amplitude of the identification information may be relatively reduced so that the identification information of the external device 200 inserted into the audible frequency band 1203 may not affect the sound. For example, when the average amplitude of the sound is '1,' the identification information is output at an amplitude of '0.5.'

The electronic device 100 may extract the identification information of the external device 200 from the sound input to the microphone (S1301). The identification information of the external device 200 may be a sinusoidal wave of a single frequency, but is not limited thereto. The amplitude of the identification information of the external device 200 may be relatively lower than that of the sound information. The electronic device 100 may identify the external device 200 generating the sound based on the identification information (S1303). In detail, the electronic device 100 converts the sound input to the microphone into an electric signal and filters the electric signal using a high pass filter, thereby outputting the identification information at a high frequency. The electronic device 100 may transmit a control command for adjusting the intensity of the sound generated by the external device 200 to the external device 200 (S1305) such that the intensity of the sound of the external device 200 is adjusted. In detail, the electronic device 100 may transmit a control command for decreasing or increasing the intensity of the sound of the external device 200.

For example, when the TV transmits a signal of 19 kHz as the identification information and the audio device transmits a signal of 20 kHz as the identification information, the smartphone may determine that an ambient sound is generated from the TV when the signal of 19 kHz is detected from the sound input through the microphone. The smartphone may determine that the sound of the TV affects a phone call and transmit a command for reducing the intensity of the sound of the TV to the TV.

When the same audio data is output through a plurality of speakers, the identification information of the speaker may be inserted into the sound output from the speaker. The electronic device 100 may extract the identification information of the speaker inserted into the sound to identify the speaker outputting the sound that is input through the microphone.

For example, when 5.1 channel speakers output the same audio data and speaker identification information is inserted into the audio data output to each of the 5.1 channel speakers, the electronic device may identify a speaker based on the identification information included in the sound input through the microphone.

Figure 14:
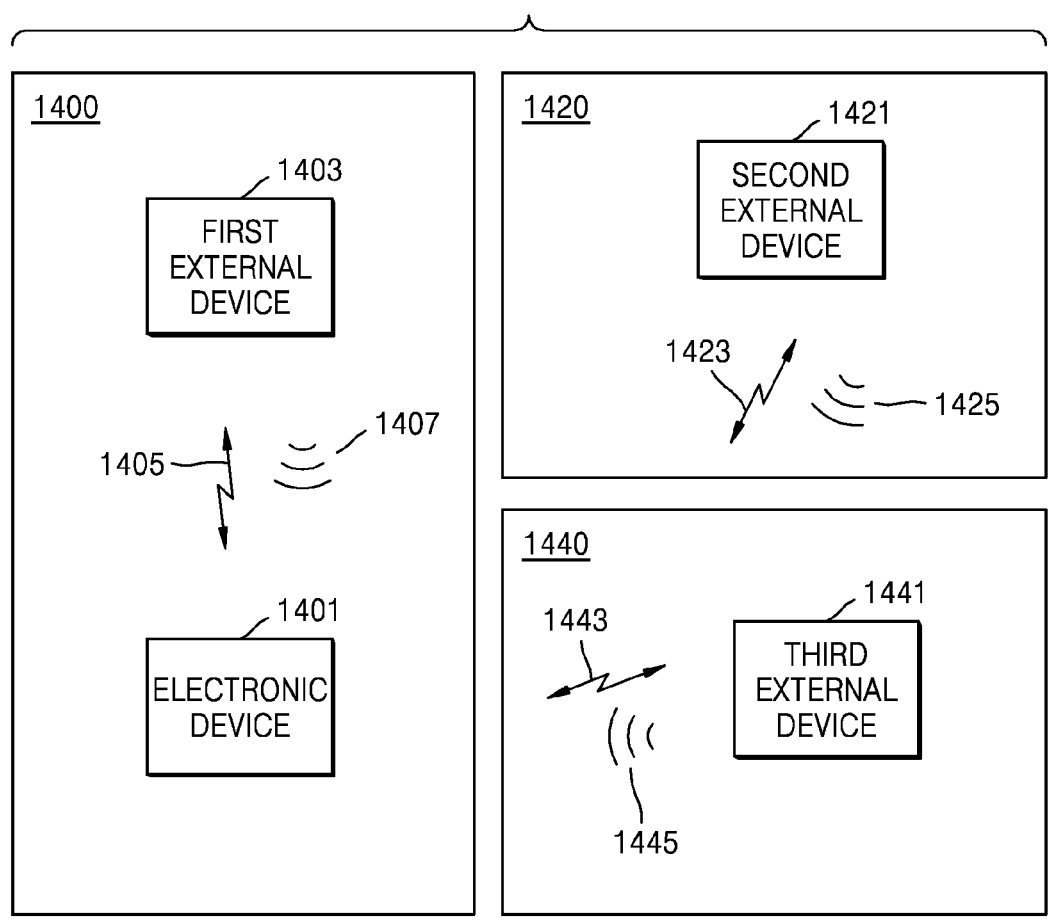
FIG. 14 is a diagram illustrating an example in which an intensity of a sound of an external device is re-adjusted according to movement of the electronic device.

FIG. 14 is a diagram illustrating an example in which the intensity of the sound of the external device is re-adjusted when the external device to be identified changes according to movement of the electronic device.

Figure 15:
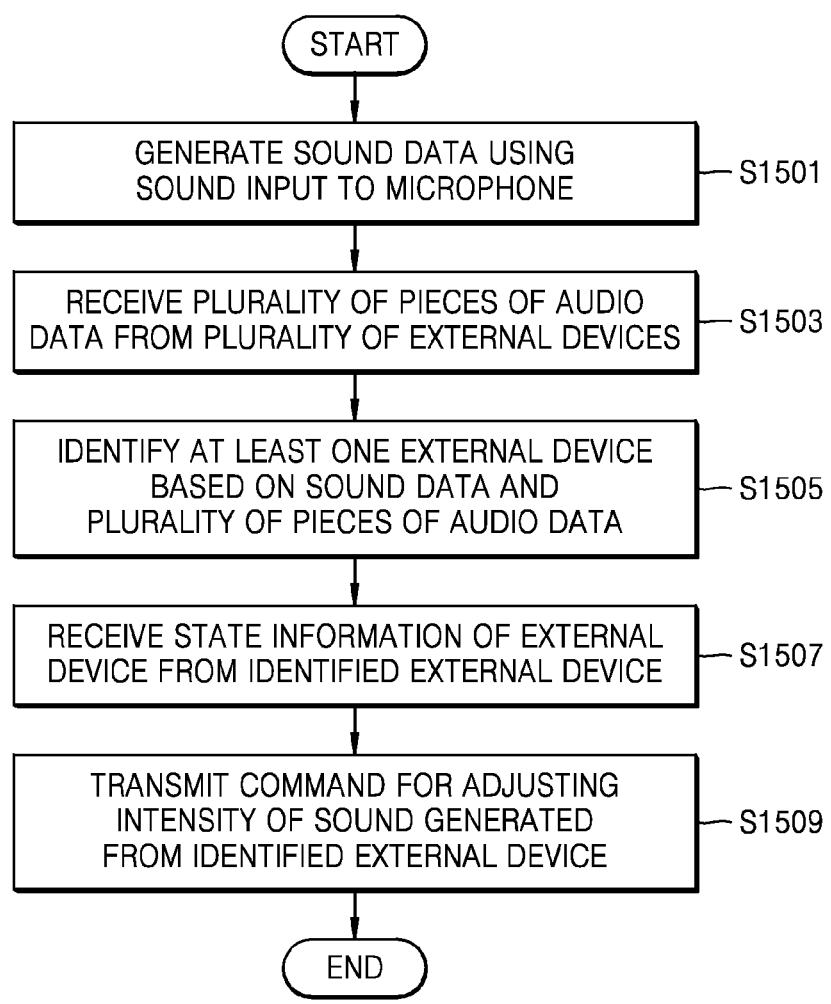
FIG. 15 is a flowchart illustrating a method of re-adjusting an intensity of a sound of an external device according to movement of the electronic device.

FIG. 15 is a flowchart illustrating a method of re-adjusting an intensity of a sound of the external device when the external device to be identified changes according to movement of the electronic device.

Referring to FIG. 14, an electronic device 1401, a first external device 1403, a second external device 1421, and a third external device 1441 are illustrated. The electronic device 1401 of FIG. 14 may be the electronic device 100 as shown in FIG. 1 and the first external device 1403, the second external device 1421, or the third external device 1441 of FIG. 14 may be the external device 200 as shown in FIG. 2 or FIG. 3. The first external device 1403 may be located in a first region 1400, the second external device 1421 may be located in a second region 1420, and the third external device 1441 may be located in a third region 1440. For example, the first region 1400 may be a living room, the second region 1420 may be a kitchen, and the third region 1440 may be a bedroom.

The electronic device 1401, for example, may be a smartphone. In a state in which the user holds the smartphone 1401, an external device identified near the smartphone 1401 may change according to movements of the smartphone 1401 to the first region 1400, the second region 1420, and the third region 1440.

Hereinafter, an example of a situation in which the user moves while holding a smartphone 1401 will be described as an exemplary embodiment. The plurality of external devices 1403, 1421, and 1441 may generate sounds 1407, 1425, and 1445 and the electronic device 1401 may generate sound data using the sounds 1407, 1425, and 1445 input to the microphone of the electronic device 1401 (S1501). The first external device 1403 may generate the sound 1407, the second external device 1421 may generate the sound 1425, and the third external device 1441 may generate the sound 1445.

The sounds 1407, 1425, and 1445 input to the microphone of the electronic device 1401 may not be generated as sound data according to distances between the electronic device 1401 and the external devices 1403, 1421, and 1441. For example, the electronic device 1401 generates the sound data based on the sound generated from the first external device 1402 close to the electronic device 1401, but may not generate the sound data based on the sound generated from the third external device 1441 relatively far from the electronic device 1401. When the distance between the electronic device 1401 and the external device 1403, 1421, or 1441 is relatively far, the sound may not be transferred to the microphone and the sound data may not be generated for the corresponding external device.

The plurality of external devices 1403, 1421, and 1441 may transmit audio data 1405, 1423, and 1443 and the electronic device 1401 may receive a plurality of pieces of audio data 1405, 1423, and 1443 from the plurality of external devices 1403, 1421, and 1441 (S1503). The first external device 1403 may transmit the audio data 1405, the second external device 1421 may transmit the audio data 1423, and the third external device 1441 may transmit the audio data 1443.

The electronic device 1401 may identify one or more external devices 1403, 1421, and 1441 based on the sound data and the plurality of pieces of audio data 1405, 1423 and 1443 (S1505). In detail, the electronic device 1401 may compare the sound data with the audio data 1405, 1423, and 1443. When it is determined that the sound data is the same as or similar to the audio data 1405, the electronic device 1401 may determine that the first external device 1403 is identified. When it is determined that the sound data is the same as or similar to the audio data 1423, the electronic device 1401 may determine that the second external device 1421 is identified. When it is determined that the sound data is the same or similar to as the audio data 1443, the electronic device 1401 may determine that the third external device 1441 is identified.

The electronic device 1401 may receive state information of the external devices 1403, 1421, and 1441 from the identified external devices 1403, 1421, and 1441 (S1507). The state information of the external devices 1403, 1421, and 1441 may respectively include information of intensities of sounds generated from the external devices 1403, 1421, and 1441. The state information of the external devices 1403, 1421, and 1441 may include intensity level information about sounds currently generated by the external devices 1403, 1421, and 1441. The sound intensity level information, for example, may include a level of a sound intensity, e.g., a natural number between 0 and 10. The state information of the external devices 1403, 1421, and 1441 may include information about operation modes of the external devices 1403, 1421, and 1441. When the external device 1403, 1421, or 1441, for example, is a cleaner with a plurality of operation modes, the state information may include current operation mode information. When the external device 1403, 1421, or 1441 is identified, the electronic device 1401 may request the identified external device 1403, 1421, or 1441 to provide state information, receive the state information of the identified external device 1403, 1421, or 1441, and store the received state information in the storage.

The electronic device 1401 may transmit a command for adjusting the intensity of the sound generated from the identified external device 1403, 1421, or 1441 (S1509). The electronic device 1401 may transmit the command for adjusting the sound to the first external device 1403 when the first external device 1403 is identified, and the first external device 1403 may adjust the sound generated from the first external device 1403 in response to the received command, e.g., decrease or increase the sound intensity or stop the generation of the sound.

The electronic device 1401 may transmit the command for adjusting the sound to the second external device 1421 when the second external device 1421 is identified, and the second external device 1421 may adjust the sound generated from the second external device 1421 in response to the received command, e.g., decrease or increase the sound intensity or stop the generation of the sound.

The electronic device 1401 may transmit the command for adjusting the sound to the third external device 1441 when the third external device 1441 is identified, and the third external device 1441 may adjust the sound generated from the third external device 1441 in response to the received command, e.g., decrease or increase the sound intensity or stop the generation of the sound.

When the identified external device changes from the first external device 1403 to the second external device 1421, the electronic device 1401 may transmit a command for re-adjusting the intensity of the sound generated from the first external device 1403.

For example, when the user is located in the region 1400, the electronic device 1401 determines that the identified external device is the first external device 1403 based on a sound 1407 input through the microphone and the audio data 1405. At this time, the first external device 1403 may transmit information about the intensity of the sound generated from the first external device 1403 to the electronic device 1401 and receive the command for adjusting the intensity of the sound from the electronic device 1401 to adjust the sound intensity.

In a state in which the user holds the electronic device 1401 and moves to the region 1420, the electronic device 1401 determines that the identified external device is the second external device 1421 based on the sound 1425 input through the microphone and the audio data 1423. The electronic device 1401 determines that the identified device changes from the first external device 1403 to the second external device 1421 and transmits information about the intensity of the sound of the first external device 1403 stored in the storage to restore the sound generated from the first external device 1403 to the original state. The first external device 1403 may receive the information to re-adjust the sound generated from the first external device 1403 to the original intensity. In addition, when the second external device 1421 is identified, the electronic device 1401 may transmit the command for adjusting the intensity of the sound generated from the second external device 1421 and receive state information from the second external device 1421.

For example, in a case where the first external device 1403 reduces an original sound intensity level of '5' to '0' in response to a command for adjusting the sound intensity received from the electronic device 1401, the first external device 1403 re-adjusts the sound intensity level to the original sound intensity level of '5' when a command for re-adjusting the sound intensity level is received from the electronic device 1401.

In addition, the electronic device 1401 may restore the sound intensity or the operation mode of the external device 1403, 1421, or 1441 to the original state without receiving state information of the identified external device 1403, 1421, or 1441. When a command for adjusting the sound intensity is received from the electronic device 1401, the external device 1403, 1421, or 1441 stores the current state information in the storage and adjusts the sound intensity. When the command for re-adjusting the sound intensity is received from the electronic device 1401, the external device 1403, 1421, or 1441 may restore the sound intensity or the operation mode to the original state based on the state information stored in the storage.

While one or more exemplary embodiments have been described with reference to the drawings, it will be understood by those of ordinary skill in the art that various changes in form and details may be made. Operations according to the exemplary embodiments may be implemented by a single processor. Exemplary embodiments may be recorded in a non-transitory computer-readable medium, being implemented in the form of a program command executable through various computer means. The non-transitory computer-readable medium may include program commands, file data, data structure, and so on individually or in combinations thereof. The program commands recorded in the medium may be those specially designed and configured for the present disclosure or those well known to those skilled in the computer software field. Examples of a non-transitory computer-readable medium include magnetic media such as a hard disk, floppy disk, and a magnetic tape; optical media such as a compact disk-read only memory (CD-ROM) and a digital versatile disk (DVD); magneto-optical media such as a floptical disk; and a hardware device specially configured to store and execute program commands such as a read only memory (ROM), a random access memory (RAM), and a flash memory. Examples of a program command include high level language codes executable in a computer by using an interpreter as well as assembly codes generated by a compiler. When all or a part of a base station or relay is implemented by a computer program, a non-transitory computer-readable recording medium storing the computer program is also included in the present disclosure.

At least one of the components, elements or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An electronic apparatus comprising:
a microphone;
a communicator configured to communicate with an external device from a plurality of external devices; and
a controller configured to:
generate sound data based on a sound input to the microphone,
receive audio data from the external device through the communicator, the audio data corresponding to a sound output from the external device,
compare the audio data of the external device with the sound data based on the sound input to the microphone,
identify, from the plurality of external devices, the external device of which the audio data is most similar with the sound data, and
control to transmit, through the communicator, a command to the identified external device, to adjust an intensity of the sound output from the external device.

2. The electronic apparatus according to claim 1, wherein the controller is configured to request the external device to provide state information, the state information comprising at least one of information about the intensity of the sound output from the external device and information about an operation mode of the external device.

3. The electronic apparatus according to claim 1, wherein the controller is configured to generate the sound data in response to receiving a request for a call from another external device through the communicator.

4. The electronic apparatus according to claim 1, wherein the audio data is generated by converting the sound output from the external device into an electric signal.

5. The electronic apparatus according to claim 1, wherein the command comprises a command to reduce a number of revolutions of a motor included in the external device.

6. The electronic apparatus according to claim 1, wherein, in response to receiving a request for a call from another external device through the communicator, the controller is configured to control a ringtone to be generated after the command is transmitted to the external device.

7. The electronic apparatus according to claim 1, wherein, in response to a change in a result of comparison between the sound data and the audio data, the controller is configured to transmit a second command to the external device to readjust the intensity of the sound output from the external device.

8. The electronic apparatus according to claim 1, wherein the audio data is generated based on a sound generated due to a revolution of a motor included in the external device.

9. An electronic apparatus comprising:
a microphone;
a communicator configured to communicate with an external device from a plurality of external devices; and
a controller configured to extract identification information of the external device from a sound input to the microphone, determine the external device from the plurality of external devices based on the identification information, and control to transmit, through the communicator, a command to the external device to adjust an intensity of a sound output from the external device,
wherein the identification information, which is separate from the sound output from the external device, is inserted to the sound output from the external device to be input to the microphone, and
wherein the identification information has an amplitude that is less than an amplitude of the sound output from the external device by a predetermined ratio.

10. An electronic apparatus comprising:
a communicator configured to communicate with a first external device and a second external device from a plurality of external devices; and
a controller configured to receive, from the first external device, sound data generated based on a sound output from the second external device through the communicator,
receive audio data from the second external device, the audio data corresponding to the sound output from the second external device, and
control to adjust an intensity of the sound output from the second external device based on a result of comparison between the sound data and the audio data by transmitting, through the communicator, a command to the second external device,
wherein hierarchical orders are preset between the electronic apparatus and the second external device, and the electronic apparatus is configured to determine whether the electronic apparatus has a hierarchical order higher than a hierarchical order of the second external device, and control the second external device based on the hierarchical order of the electronic apparatus higher than the hierarchical order of the second external device.

11. The electronic apparatus according to claim 10, wherein the command is transmitted to the second external device through the first external device.

12. A method of adjusting an intensity of a sound output from an external device from a plurality of external devices by an electronic apparatus comprising a microphone, the method comprising:
generating sound data based on a sound input to the microphone;
receiving audio data from the external device, the audio data corresponding to the sound output from the external device;
comparing the audio data of the external device with the sound data based on the sound input to the microphone;
identifying, from the plurality of external devices, the external device of which the audio data is most similar with the sound data; and
transmitting a command to the external device, to adjust the intensity of the sound output from the external device.

13. The method according to claim 12, wherein the generating comprises generating the sound data in response to receiving a request for a call from another external device.

14. The method according to claim 12, further comprising:
in response to receiving a request for a call at the electronic apparatus, controlling a ringtone to be generated in the electronic apparatus after the transmitting the command is performed.

15. A method of adjusting an intensity of a sound output from an external device from a plurality of external devices by an electronic apparatus comprising a microphone, the method comprising:
extracting identification information of the external device from a sound input to the microphone;
determining the external device from the plurality of external devices based on the identification information; and
transmitting a command to the external device to adjust the intensity of the sound output from the external device,
wherein the identification information, which is separate from the sound output from the external device, is inserted to the sound output from the external device to be input to the microphone, and
wherein the identification information has an amplitude that is less than an amplitude of the sound output from the external device by a predetermined ratio.

16. A method of adjusting an intensity of a sound of a first external device from a plurality of external devices by an electronic apparatus, the method comprising:
receiving sound data generated based on a sound output from the first external device, from a second external device;
receiving audio data from the first external device, the audio data corresponding to the sound output from the first external device; and
controlling to adjust the intensity of the sound output from the first external device based on a result of comparison between the sound data and the audio data by transmitting a command to the first external device,
wherein hierarchical orders are preset between the electronic apparatus and the first external device, and the controlling comprises determining whether the electronic apparatus has a hierarchical order higher than a hierarchical order of the first external device, and controlling the first external device based on the hierarchical order of the electronic apparatus higher than the hierarchical order of the first external device.

17. A method of adjusting an intensity of a sound of an external device from a plurality of external devices by an electronic apparatus comprising a microphone, the method comprising:
generating sound data based on a sound input to the microphone;
receiving a plurality of audio data from the plurality of external devices, the plurality of audio data corresponding to sounds output from the plurality of external devices, respectively;
compare audio data of the external device with the sound data based on the sound input to the microphone;
identify, from the plurality of external devices, the external device of which the audio data is most similar with the sound data; and
transmitting a command to the external device, to adjust an intensity of a sound output from the external device.

18. The method according to claim 17, further comprising:
receiving state information of the external device from the external device, the state information comprising at least one of information about the intensity of the sound output from the external device and information about an operation mode of the external device.

19. The method according to claim 17, further comprising:
in response to a change in a result of comparison between the sound data and the audio data, transmitting a second command to readjust the intensity of the sound output from the external device.

20. An electronic apparatus comprising:
a sensor configured to sense a first intensity level of an ambient sound; and
a controller configured to obtain a second intensity level of a sound output from an external device from a plurality of external devices,
compare the first intensity level of the ambient sound with the second intensity level of the sound output from the external device, and
control to adjust the second intensity level of the sound output from the external device based on the second intensity level of the sound output from the external device from the plurality of external devices being similar to the first intensity level sensed by the sensor.

21. The electronic apparatus according to claim 20, wherein the controller is configured to control to adjust the second intensity level in response to a proportion of the second intensity level to the first intensity level being a predetermined percentage or more.

22. The electronic apparatus according to claim 20, wherein the controller is configured to obtain the second intensity level of the sound output from the external device by receiving, from the external device, audio data that is being reproduced by the external device.

23. The electronic apparatus according to claim 20, wherein the controller is configured to obtain the second intensity level of the sound output from the external device by receiving, from the external device, audio data that is generated by recording the sound output from the external device and converting the recorded sound into an electric signal.

* * * * *